Patented Oct. 3, 1933

1,929,210

UNITED STATES PATENT OFFICE 1,929,210

COMPOSITION CONTAINING CELLULOSE DERIVATIVES

William Henry Moss, Cumberland, Md., assignor to Celanese Corporation of America, a corporation of Delaware No Drawing. Original application November 26, 1928, Serial No. 322,100. Divided and this application January 16, 1930. Serial No. 421,314

6 Claims. (Cl. 106—40)

This application is a division of my U. S. application, 322,100 filed Nov. 26, 1928.

This invention relates to a plastifier or softener for use in connection with cellulose derivatives in liquid and plastic compositions, and relates more particularly to the use of a diphenylol naphthene for this purpose.

An object of my invention is to prepare a diphenylol naphthene by the condensation of phenol with a cyclic ketone.

Another object of my invention is to use a diphenylol naphthene such as dihpenylol cyclohexane, as a plastifier in connection with derivatives of cellulose. Other objects of my invention will appear from the following detailed description.

In the technical applications of cellulose derivatives, such as cellulose acetate or cellulose nitrate, it is often necessary to add to the cellulose derivatives various non-volatile solvents for the same. These non-volatile solvents remain permanently in the article manufactured from such compositions, an increase the plasticity and suppleness of the same and therefore improve its value in many technical applications. Thus, if films such as photographic films were made of cellulose acetate or cellulose nitrate alone, the product would be too hard and brittle for most uses, whereas if these non-volatile solvents are added, the materials are made soft and elastic. Such non-volatile solvents are known as plastifiers or softening agents. However, the number of such plastifiers or softening agents available for use with cellulose derivatives is limited. I have found that the products formed by condensing phenols with hydrogenated quinones such as cyclohexanone are excellent plastifiers for cellulose derivatives.

While the condensation products of acetone or ketones of low molecular weight with phenol are known and described in the literature, the condensation of phenol with ketones of higher molecular weight becomes very difficult with ascent of the molecular weight of the ketone employed. With heavy ketones it is difficult to cause condensation, and resinous products are formed together with the desired crystalline compounds as by-products. However, I have found that when the cyclic ketones such as cyclohexanone are condensed with phenol, the reaction proceeds extremely smoothly and a good yield is obtained.

In accordance with my invention, I prepare a diphenylol naphthene by condensing together a phenol and a ketone of the naphthene series. The product thus formed is eminently suited as a plastifier for use in connection with compositions containing derivatives of cellulose. The phenol employed may be the simple phenols or substituted phenols such as cresol, halogenated phenol and the like. While I prefer to employ cyclohexanone as the ketone of the naphthene series, other such ketones or hydrogenated quinones such as cyclopentanone, cycloheptanone or methyl cyclohexanone and the like may be employed. Substituted cyclic ketone, such as the alkyl or aryl substitution products of the same may also be employed.

The diphenylol naphthene that is formed may be easily purified by crystallization from benzene or acetic acid and may be obtained in sufficiently pure form for commercial purposes by mere washing with water. Since the vapor pressure of the crystals thus formed is small, they are extremely suitable for use as a softener or a plastifier of cellulose derivatives.

The diphenylol naphthene formed by my process may be used in association with derivatives of cellulose together with solvents, other plastifiers, resins or effect materials to make coating compositions such as lacquers, plastic compositions for various uses, and also solutions for making films or artificial silk.

Examples of the derivatives of cellulose that may be plastified with my new compound are cellulose nitrate and organic derivatives of cellulose. The organic derivatives of cellulose may be organic esters of cellulose such as cellulose acetate, cellulose formate, cellulose propionate and cellulose butyrate, or cellulose ethers such as ethyl cellulose, methyl cellulose and benzyl cellulose.

If desired other plastifiers such as diethyl phthalate, dibutyl phthalate, triacetin, diphenylol propane, diethyl tartrate, etc., may be employed. Suitable volatile solvents such as acetone, ethyl alcohol, methyl alcohol, benzene, chloroform or suitable mixtures of these may be employed for making the solution. If desired, medium and/or high boiling solvents such as ethyl lactate, butyl alcohol, butyl acetate, diacetone alcohol, etc., may also be employed. If desired, resins may also be incorporated in the composition containing the plastifier and the derivatives of cellulose. This resin may be a synthetic resin compatible with the derivative of cellulose employed such as phenol-aldehyde resins prepared in the presence of an acid catalyst, diphenylol propane-formaldehyde resin, diphenylol propane-acetone resin, the resin prepared by condensing lactic acid, etc. Also natural resins which are compatible with the derivative of cellulose or which are not so incompatible as to destroy the value of the finished product may be employed. Examples of such natural resins are ester gum, dammar, rosin, kauri, accaroides, etc.

As an example of a method of preparing a diphenylol naphthene, the following description of a method of preparing diphenylol cyclohexane is given:

98 parts by weight of cyclohexanone and 188 parts by weight of phenol together with approximately 35 parts by weight of hydrochloric acid solution of 1.19 specific gravity are heated under reflux at 70 to 80° for 24 hours. On cooling, rapid crystallization occurs, and the crystals of the compound diphenylol cyclohexane having the following formula are obtained:

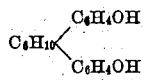

These crystals are filtered off and purified by crystallization from benzene or acetic acid or may be merely washed with water. The purified compound thus obtained has a melting point of about 187° C. This compound is soluble in acetone and alcohol, and solutions of the same in these solvents are suitable for addition to solutions of cellulose acetate or cellulose nitrate. When added to cellulose derivatives in the proportion of 1 to 100% of the weight of the cellulose derivative, the diphenylol cyclohexane forms an excellent plastifier, imparting to films or plastics containing it, the desirable qualities of toughness and elasticity.

In order to further illustrate my invention but without being limited thereto, the following specific examples of compositions containing diphenylol cyclohexane and derivatives of cellulose are given.

Example I

The following is an example of a coating composition:

|  | Parts by weight |
|---|---|
| Cellulose acetate | 10 |
| Diphenylol cyclohexane | 4 |
| Acetone | 100 |

If desired, 5 parts of benzyl alcohol or 10 parts of ethyl lactate or diacetone alcohol may be added to retard the evaporation of the solvent.

Example II

The following is an example of a colored coating composition.

|  | Parts by weight |
|---|---|
| Cellulose acetate | 10 |
| Diphenylol cyclohexane | 5 |
| Pigment | 2.5 |
| Acetone | 50 |
| Benzene | 25 |
| Alcohol | 25 |
| Ethyl oxybutyrate | 15 |

Example III

As stated, if desired, resins either synthetic or natural may be employed, together with the cellulose derivatives and the plastifier and the following is an example of this:

|  | Parts by weight |
|---|---|
| Cellulose acetate | 10 |
| A compatible resin | 10 |
| Diphenylol cyclohexane | 5 |
| Acetone | 50 |
| Eethyl acetate | 30 |
| Diacetone alcohol | 20 |

The resin may be any of the above mentioned synethetic resins or natural resins that are compatible or only slightly compatible with cellulose acetate, as above described.

Example IV

The following is an example of the use of my plastifier in connection with cellulose nitrate:

|  | Parts by weight |
|---|---|
| Cellulose nitrate | 10 |
| Diphenylol cyclohexane | 4 |
| Ester gum | 8 |
| Benzene | 20 |
| Ethyl alcohol | 10 |
| Ethyl acetate | 30 |
| Butyl alcohol | 20 |
| Butyl acetate | 20 |

Example V

The following is an example of a solution containing a cellulose ether and diphenylol cyclohexane:

|  | Parts by weight |
|---|---|
| Benzyl cellulose | 10 |
| Diphenylol cyclohexane | 4 |
| Ethyl acetate | 60 |
| Toluene | 20 |
| Ethyl lactate | 10 |

Example VI

The following is an example of a plastic composition:

|  | Parts by weight |
|---|---|
| Cellulose acetate | 100 |
| Diphenylol cyclohexane | 40 |
| Alcohol | 50 |
| Benzene | 50 |

Example VII

A composition suitable for use in spinning to form artificial silk, bristles or the like may contain:

|  | Parts by weight |
|---|---|
| Cellulose acetate | 100 |
| Diphenylol cyclohexane | 15 |
| Acetone | 400 |

Example VIII

A solution of low concentration which is suitable as an adhesive for causing sheets of plastic material containing derivatives of cellulose to adhere to glass for making laminated glass may be made as follows:

|  | Parts by weight |
|---|---|
| Cellulose acetate | 2 |
| Diphenylol cyclohexane | 1 |
| A compatible light-colored resin | 3 |
| Acetone | 100 |
| Ethyl lactate | 20 |
| Benzene | 50 |
| Alcohol | 50 |

It is to be understood that the foregoing detailed description is given merely by way of illustration and that many variations may be made therein without departing from the spirit of my invention.

Having described my invention what I claim and desire to secure by Letters Patent is:

1. A composition of matter containing a derivative of cellulose and a diphenylol naphthene as plastifier.
2. A composition of matter containing an organic derivative of cellulose and a diphenylol naphthene as plastifier.
3. A composition of matter containing cellulose acetate and a diphenylol naphthene as plastifier.
4. A composition of matter containing a derivative of cellulose and diphenylol cyclohexane as plastifier.
5. A composition of matter containing an organic derivative of cellulose and diphenylol cyclohexane as plastifier.
6. A composition of matter containing cellulose acetate and diphenylol cyclohexane as plastifier.

WILLIAM HENRY MOSS.